United States Patent
Kushwaha et al.

(10) Patent No.: US 8,868,717 B2
(45) Date of Patent: Oct. 21, 2014

(54) SYSTEM AND METHOD FOR TRAP MANAGEMENT AND MONITORING ON WIRELESS TERMINALS

(75) Inventors: Rakesh Kushwaha, Marlboro, NJ (US); Badri Nath, Edison, NJ (US)

(73) Assignee: Mformation Software Technologies LLC, Woodbridge, NJ (US)

( * ) Notice: Subject to any disclaimer, the term of this patent is extended or adjusted under 35 U.S.C. 154(b) by 558 days.

(21) Appl. No.: 11/374,987

(22) Filed: Mar. 15, 2006

(65) Prior Publication Data

US 2006/0212562 A1    Sep. 21, 2006

Related U.S. Application Data

(60) Provisional application No. 60/661,507, filed on Mar. 15, 2005.

(51) Int. Cl.
| | |
|---|---|
| *G06F 15/16* | (2006.01) |
| *G06F 15/173* | (2006.01) |
| *G06F 15/177* | (2006.01) |
| *H04W 24/08* | (2009.01) |
| *H04L 12/24* | (2006.01) |
| *H04L 12/26* | (2006.01) |
| *H04M 1/725* | (2006.01) |

(52) U.S. Cl.
CPC .......... *H04L 43/0817* (2013.01); *H04W 24/08* (2013.01); *H04L 41/046* (2013.01); *H04L 43/067* (2013.01); *H04M 1/72519* (2013.01)
USPC .......... 709/224; 709/223; 709/217; 709/219; 709/220; 709/228

(58) Field of Classification Search
CPC . H04L 43/08; H04L 41/0681; H04L 41/0213; H04L 41/06; G06F 11/00
USPC .......... 717/168–178; 709/224, 223, 217, 219, 709/220, 228
See application file for complete search history.

(56) References Cited

U.S. PATENT DOCUMENTS 5,327,558 A * 7/1994 Burke et al. .................. 710/8
6,128,656 A * 10/2000 Matchefts et al. ............ 709/223
(Continued)

FOREIGN PATENT DOCUMENTS

| EP | 1501239 A1 | 1/2005 |
|---|---|---|
| EP | 2083527 A1 | 7/2009 |

(Continued)

OTHER PUBLICATIONS

International Search Report dated Feb. 14, 2008 received in corresponding PCT/US06/09289.

(Continued)

*Primary Examiner* — Rupal Dharia
*Assistant Examiner* — Mohammed Ahmed
(74) *Attorney, Agent, or Firm* — Brosemer, Kolefas & Associates, LLC

(57) ABSTRACT

A wireless device and a method for providing remote trap management of the wireless device by which a management server remotely sets a trap whose trigger needs to be monitored. A method for providing remote trap management of a wireless device comprises receiving from a remote device a request to install a trap on the wireless device, installing the trap on the wireless device, generating trap status information upon occurrence of a trap and transmitting the trap status information to the remote device in response to the occurrence of the trap.

28 Claims, 5 Drawing Sheets

(56) References Cited

U.S. PATENT DOCUMENTS

| | | | |
|---|---|---|---|
| 6,182,157 B1* | 1/2001 | Schlener et al. | 719/318 |
| 6,804,718 B1* | 10/2004 | Pang et al. | 709/226 |
| 2002/0068559 A1* | 6/2002 | Sharma et al. | 455/423 |
| 2002/0069037 A1* | 6/2002 | Hendrickson et al. | 702/186 |
| 2002/0112047 A1* | 8/2002 | Kushwaha et al. | 709/223 |
| 2002/0120730 A1* | 8/2002 | Goudzwaard et al. | 709/223 |
| 2004/0024865 A1* | 2/2004 | Huang et al. | 709/224 |
| 2004/0098715 A1* | 5/2004 | Aghera et al. | 717/173 |
| 2004/0098721 A1* | 5/2004 | Alverson et al. | 718/102 |
| 2004/0208177 A1* | 10/2004 | Ogawa | 370/392 |
| 2005/0027835 A1* | 2/2005 | Raikar et al. | 709/222 |
| 2005/0075096 A1* | 4/2005 | Aljuraid | 455/414.1 |
| 2005/0256614 A1* | 11/2005 | Habermas | 701/1 |
| 2007/0198993 A1* | 8/2007 | Zhang et al. | 719/318 |
| 2008/0126836 A1* | 5/2008 | DiZoglio et al. | 714/4 |
| 2008/0134166 A1* | 6/2008 | Gallo et al. | 717/173 |

FOREIGN PATENT DOCUMENTS

| | | |
|---|---|---|
| JP | 2002543722 | 12/2002 |
| JP | 2005065247 | 3/2005 |
| WO | 0067507 | 11/2000 |
| WO | 03088699 A1 | 10/2003 |

OTHER PUBLICATIONS

Extended European Search report dated Nov. 16, 2010 received in corresponding PCT/US2006/009289.
Office Action dated Apr. 25, 2011 in corresponding Japanese Patent Application No. 2008-501994.
Office Action dated Nov. 28, 2011 received in Patent application No. 2008-501994.
Decision of Final Rejection dated Jun. 15, 2012 received in Japanese Patent Application No. 2008-501994.
Communication from the European Patent Office dated Jun. 18, 2012 received in Application No. 06 738 361.2-2416.

* cited by examiner

SYSTEM AND METHOD FOR TRAP MANAGEMENT AND MONITORING ON WIRELESS TERMINALS

CROSS-REFERENCE TO RELATED APPLICATIONS

This application claims the benefit of Provisional Application No. 60/661,507, filed Mar. 15, 2005.

FIELD OF THE INVENTION

The present invention relates generally to remote trap management and in particular, to a system for programming, monitoring and reporting of the status of trap execution on wireless data terminals.

BACKGROUND OF THE INVENTION

Generally, traps are software interrupts. For example, traps are special instructions that are embedded in programs that cause the program to transfer control to a trap handler routine or which are explicitly called when an exception occurs. Typically, after a trap is triggered, the trap handler routine is, executed and the control is transferred back to the program that caused the trap. Traps can also be explicitly set so as to execute a trap handler when a specific condition is met. Since traps are embedded in programs, they cannot be easily changed by external means.

In wireless devices, there is a need to set traps to gather information about events due to certain conditions on the device. Not all traps can be set a priori. Some of the traps have to be remotely set, i.e., activated and the conditions for a trap trigger should be remotely programmable. Unlike traditional systems, in wireless systems it does not suffice just to execute a trap handler locally. The result of the execution of the trap handler caused by a trap trigger must be sent to a server for purposes of diagnostics. Since wireless devices are resource constrained and bandwidth is at a premium, not every trap trigger needs to be sent to a management server.

For the various traps that can be set only a sub set of them needs to be monitored and the results sent to an external management server. Just the execution of the trap handler is not sufficient. A monitoring agent on the device should check if any of the traps have been triggered and then at an appropriate time send the results to the management server.

Since there are many traps that can be set and monitored, a monitoring agent needs a structured way of enumerating the traps that have triggered. A simple list of possible traps will be too inefficient. The traps have to be organized in a hierarchy of categories so that the management server can specify categories of interest. Within each category, specific traps can be monitored.

Hence, there is a need to efficiently categorize the traps into several classes, and then monitor traps in each class on a wireless data terminal and the according to a policy send the results of a trigger to a management server.

SUMMARY OF THE INVENTION

The present invention is a wireless device and method by which a management server remotely sets a trap whose trigger needs to be monitored. A monitoring agent on the device traverses a trap definition tree to check for triggered traps. For those traps that are enabled by the remote server, the monitoring agent on the wireless data terminal dynamically transfers the trap status code to a management server under appropriate conditions.

One aspect of the invention is a method by which the management server enables the trap to be set and enables the trap to be monitored. The wireless data terminal, after verification of the server credentials, can install the trap along with the conditions under which the trap status needs to be sent to a management server. The conditions for sending the results may be temporal, spatial, device dependent, network dependent or any combination there of.

Another aspect of the invention is the specification of the trap tree. The trap tree indicates a hierarchy of trap categories. The categories can be broadly defined based on device state, network state, application state, device action, network action, or application action. Given the lists of traps implemented on the wireless data terminal, the trap handlers are programmed to enable the node based on the category of the trap. For example, battery low or battery fully charged will be classified as a device state trap. A similar trap that falls under the device state category is a memory full event. Examples of traps based on network action include connection failure or a connection failure to an application specific server.

Yet another aspect of the invention is the definition of trap node that is named and enabled when the corresponding event is triggered. Within each category the type of trap is a node whose name indicates the type of the trap and within each node the names of the trap administration variables and the trap payload. The trap payload defines the form and structure of the trap status information that will be sent to a management server. An example of a trap node is a "device coverage" node and a trap is triggered when the device goes out of coverage. If the trap is enabled, the monitoring agent on the device will send status information in the trap payload whenever the device goes out of coverage. Another example of a trap node is a "roaming" node and a trap is triggered when the device roams away from the home network. Further, the conditions under which the payload is sent can be programmed as well. Conditions include temporal (e.g., every two hours), spatial (e.g., at a given location) or based on the number of occurrence of trap triggers.

Yet another aspect of the invention is an efficient structure for the trap payload. The trap status may be sent to the monitoring server in a compact form. The trap name or an identifier from a registry, along with the timestamp and location stamp is sent to the server. Since the status could contain the execution of several traps, the payload contains a chained structure of trap status information. The method further includes a means to store the traps status as a tree structure to mirror the categories of the traps on the device.

BRIEF DESCRIPTION OF THE DRAWINGS

The included drawings illustrate the method and system used in remote trap management. Along with the description, these drawings explain the invention and novelty.

DETAILED DESCRIPTION

Trap management includes over the air activation/deactivation of trap monitoring and programming of trap generation conditions by means of commands sent from the monitoring server. Trap monitoring includes checking the status of the set traps and generation of traps. Trap reporting includes packaging the status and attributes of any traps that were set and sending it to the monitoring server. The information about all the traps is maintained in a well-defined Trap management tree data structure. The specification trap sub tree data structure defines the nodes of the tree and the semantics associated with the tree.

Figure 1:
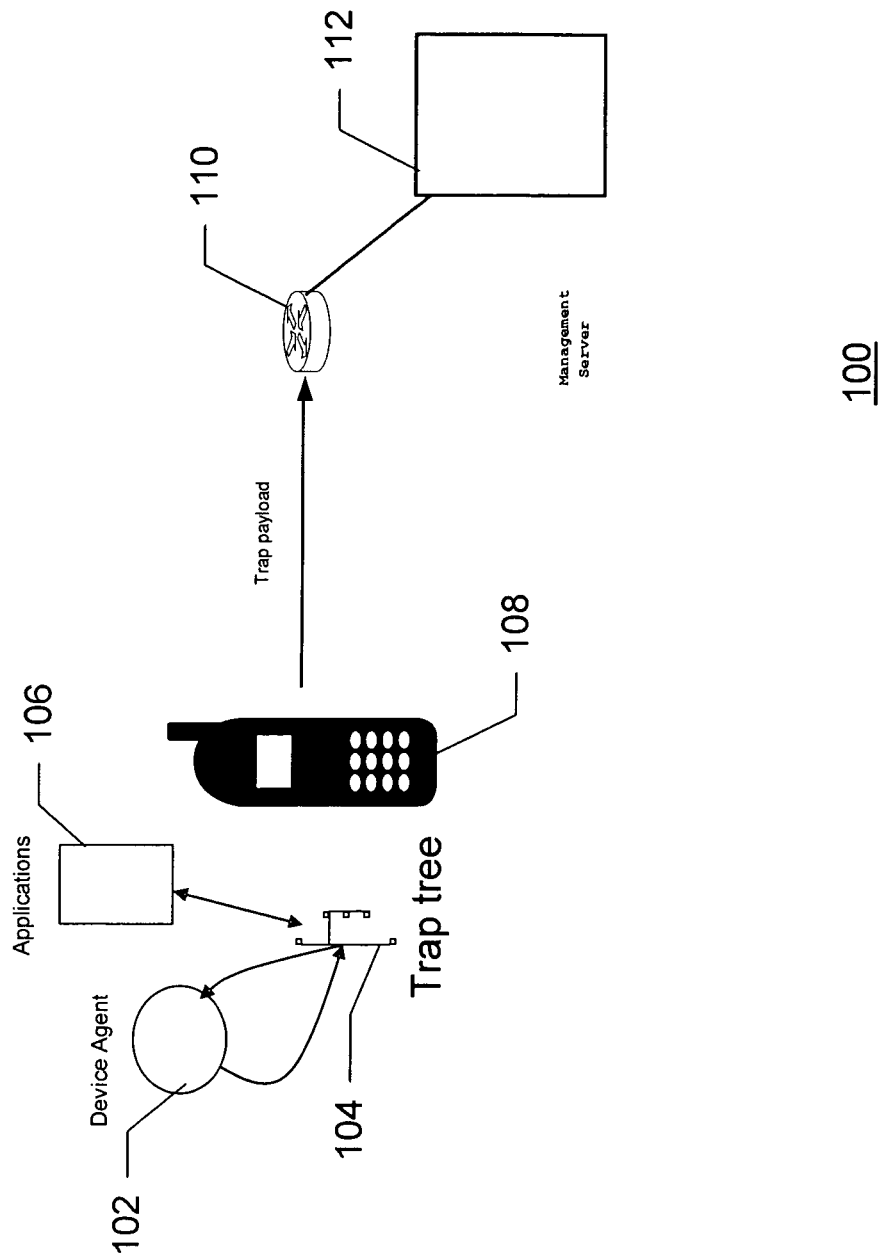
FIG. 1 is an exemplary diagram showing the overall system architecture that consists of a device agent, trap tree, and a management server

An example of an overall system architecture 100 in which he present invention may be implemented is shown in FIG. 1. System 100 includes a device monitoring agent 102, a trap tree 104, applications 106, wireless device 108, network 110, and a management server 112. Monitoring agent 102, on device 108, checks if any of the traps have been triggered and then at an appropriate time sends the results to the management server 112 via the network 110. Since there are many traps that can be set and monitored, monitoring agent 102 needs a structured way of enumerating the traps that have triggered. Trap tree 104 organizes the traps in a hierarchy of categories so that the management server 112 can specify categories of interest. Within each category, specific traps can be monitored. Applications 106 are among the entities that may trigger traps, or which may be interrupted by a trap.

Figure 2:
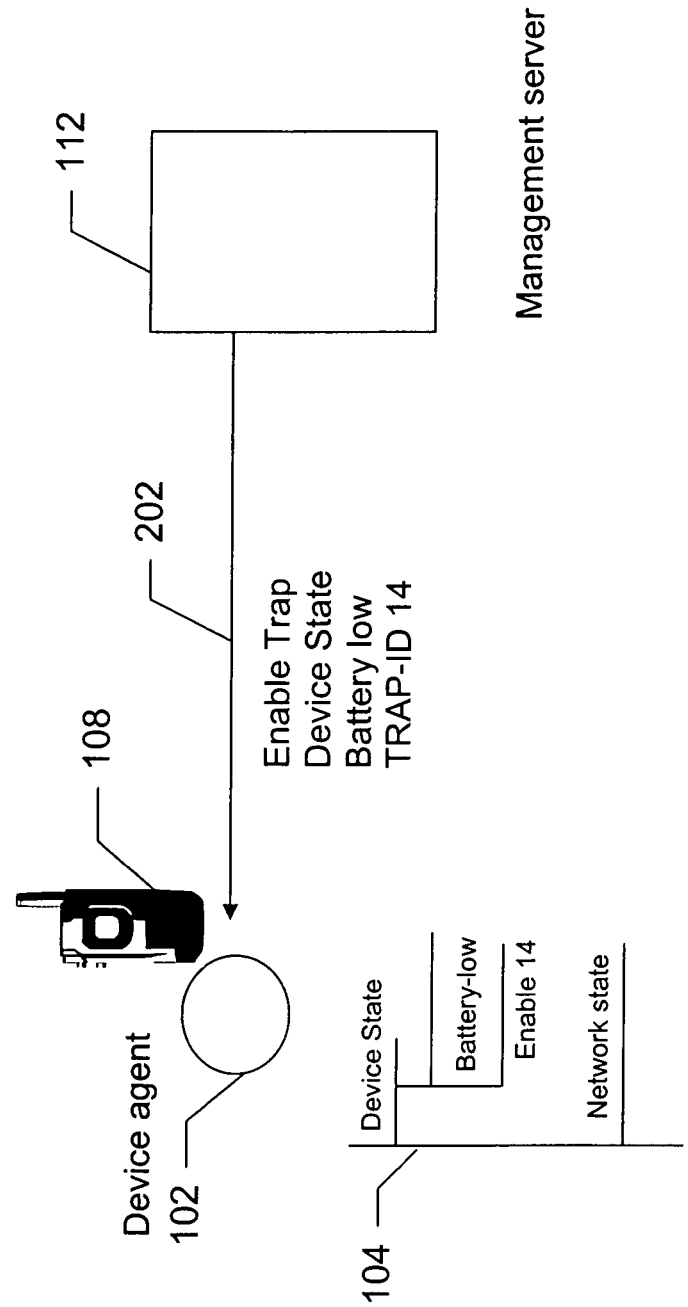
FIG. 2 is an exemplary diagram illustrating the interaction between the management server and the wireless data terminal to program and set a trap remotely on a wireless data terminal
Figure 3:
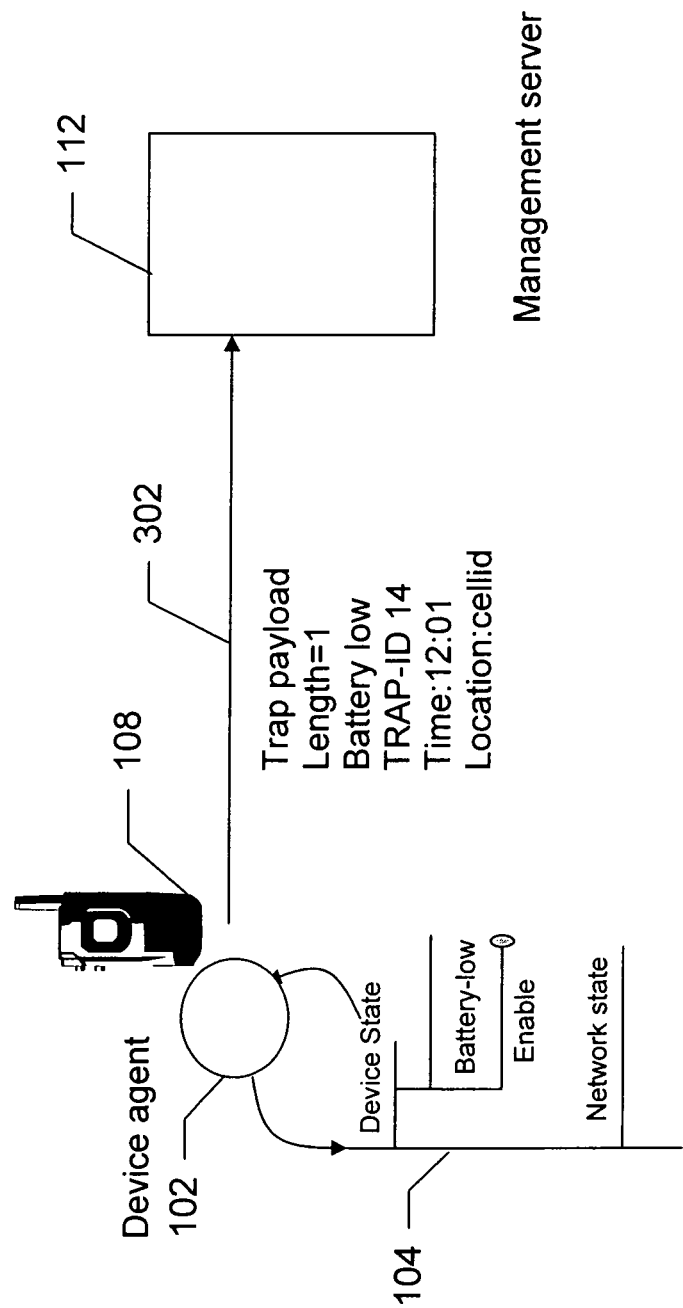
FIG. 3 is an exemplary diagram showing the interaction between the device agent and the management server in sending a sample trap payload to the server

Traps are status messages that are sent to the management server 112 by the device 108 when trap generation conditions are met on any or all the nodes of the trap management tree. An example of this is shown in FIG. 3. Traps are reported immediately after a condition associated with trap becomes true. However, if the trap is enabled, the reporting conditions can be set in such a way that the trap payload is sent to the management server only when certain conditions are satisfied. The conditions that could be set on a trap node could be, for example, a change in the Trap Node Attribute, reporting frequency, aggregate conditions (number of trap status changes configured while setting the trap) or that a dependent trap node status has changed. For example, a trap can be set on 'Device Coverage Node' to report status when coverage conditions change, when a number, 'K', coverage changes have occurred, or to report all coverage changes every 2 hours. A device agent that is monitoring the conditions will set the trap trigger to be true. A series of traps can be defined, not all of which need to be monitored. The number of traps that are set may be independent of the number of traps that are monitored. A trap-enabled directive can be set by a device agent to indicate that the status of the trap is of interest to the monitoring agent at the server. The specific traps to be monitored are sent as commands from the management server to the device agent as illustrated in FIG. 2. In particular, management server 112 transmits commands 202 specifying the traps that are to be monitored by device agent 102 to device 108, where the information in command 202 is used to populate trap tree 104.

Figure 4:
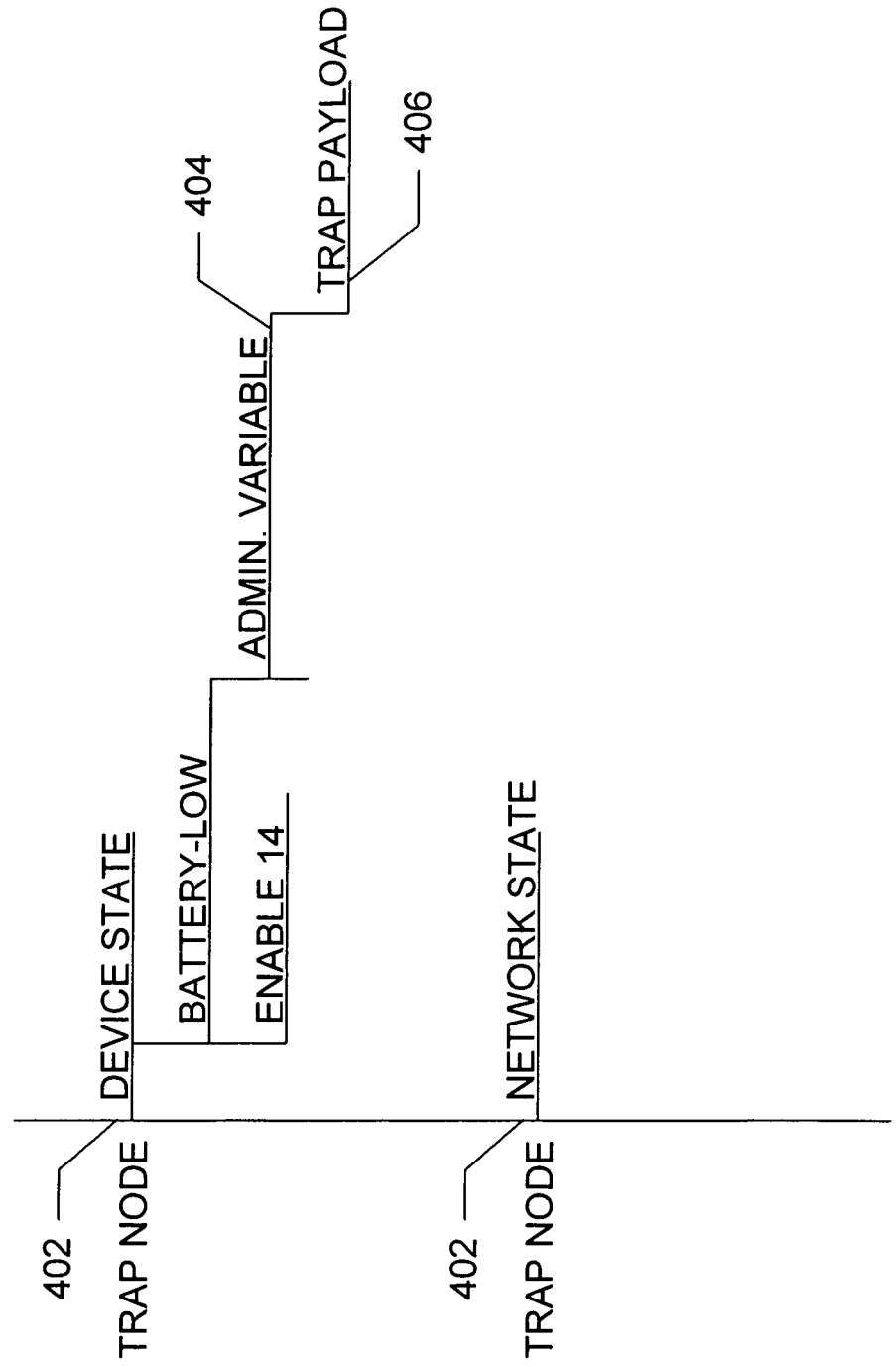
FIG. 4 is an exemplary format of a trap tree according to the present invention.

An example of a trap tree 400 is shown in FIG. 4. Trap tree 400 includes trap nodes 402, trap administration variables 404, and trap payload 406. A trap node 402 defines the type of trap that can be set, the trap administration variables 404 reflect the state of the trap, and the trap payload 406 is used to communicate that status of the trap to the monitoring server.

Figure 5:
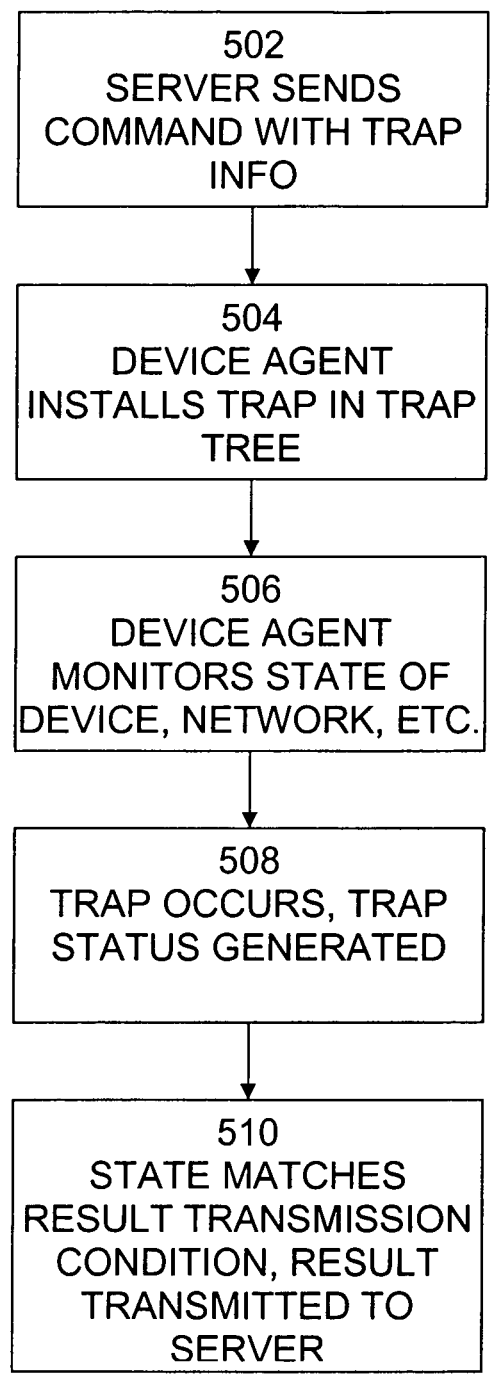
FIG. 5 is an exemplary flow diagram of a process of trap management and monitoring.

Turning to FIG. 3, the device agent 102 scans all the trap nodes in trap tree 104 to check for the status of the traps. For those traps that have $TRAP_{13}$ enabled property set to true and whose trap trigger has been set, a client event alert 302 is sent to management server 112. If needed, server 112 can then get the complete state of the system that generated the trap event. Appropriate traps can be set in trap tree 104 that allow for reporting diagnostics and performance information to the server. These include:

Device Network Coverage (the states include No Coverage, Emergency, Voice and Voice/Data)
    Battery conditions
    Memory conditions
    SIM card insert/removal
    Report on Application Install/Uninstall activity
    Track voice calls for termination causes
    Track durations of voice calls, voice/data calls
    Track Network and Location changes
    Install Failure
    Download failure
    APN Connect Failure
    MMS Connect Failure
    EMAIL Connect Failure
    ROAMING Failure
    Traps based on threshold An example of a process 500 by which the management server enables the trap to be set and by which the trap is monitored is shown in FIG. 5. Process 500 begins with step 502, in which the server sends commands including trap setup information to the wireless device, as shown in FIG. 2. In step 504, the device agent uses the trap setup information to install the specified traps into the trap tree. The device agent, after verification of the server credentials, installs the trap along with the conditions under which the trap status needs to be sent to the management server. The conditions for sending the results may be temporal, spatial, device dependent, network dependent or any combination there of.

In step 506, the device agent monitors the state of the device, the state of the network, the location of the device, etc. In step 508, a trap occurs. The trap tree indicates a hierarchy of trap categories. The categories can be broadly defined based on device state, network state, application state, device action, network action, or application action. Given the lists of traps implemented on the wireless data terminal, the trap handlers are programmed to enable the node based on the category of the trap. For example, battery low or battery fully charged will be classified as a device state trap. A similar trap that falls under the device state category is a memory full event. Examples of traps based on network action include connection failure or a connection failure to an application specific server.

In step 510, the device agent determines that the monitored states match one or more specified conditions under which trap result status is to be transmitted to the server. Within each category the type of trap is a node whose name indicates the type of the trap and within each node the names of the trap administration variables and the trap payload. The trap payload defines the form and structure of the trap status information that will be sent to the management server. An example of a trap node is a "device coverage" node and a trap is triggered when the device goes out of coverage. If the trap is enabled, the monitoring agent on the device will send status information in the trap payload whenever the device goes out of coverage. Another example of a trap node is a "roaming" node and a trap is triggered when the device roams away from the home network. Further, the conditions under which the payload is sent can be programmed as well. Conditions include temporal (e.g., every two hours), spatial (e.g., at a given location) or based on the number of occurrence of trap triggers.

The trap status may be sent to the management server in a compact form. The trap name or an identifier from a registry, along with the timestamp and location stamp is sent to the server. Since the status could contain the execution of several traps, the payload contains a chained structure of trap status information. The method further includes a means to store the traps status as a tree structure to mirror the categories of the traps on the device.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

The invention claimed is:

1. A method for providing remote trap management of a wireless device, comprising:
receiving at the wireless device a request from a remote device to install a trap instruction in software on the wireless device, the request including an identification of the trap instruction, and information indicating at least one trap status generation condition for the trap instruction;
installing the trap instruction on the wireless device in response to the request from the remote device using the received identification of the trap instruction, and information indicating the at least one trap status generation condition for the trap instruction, wherein the trap instruction is installed on the wireless device including storing information relating to the trap in a tree structure in which nodes of the tree structure define traps that can be set, the tree structure organizing traps in a hierarchy of categories and each node being associated with a trap name, at least one trap administration variable, a trap payload, and at least one condition defining when the trap payload is to be transmitted;
monitoring one or more traps within the hierarchy of categories in the tree structure based on one or more commands sent from the remote device to the wireless device, the one or more traps to be monitored being independent from the number of traps that have been defined;
generating an aggregated payload of trap status information by traversing the tree structure and collecting trap status information from a plurality of nodes of the tree structure; and
transmitting the aggregated payload of trap status information to the remote device.

2. The method of claim 1, wherein the remote device is a management server.

3. The method of claim 2, wherein the wireless device accepts the trap request only after verifying a signature of the management server and transmits an acknowledgement to the management server after the trap is enabled.

4. The method of claim 1, wherein the trap status information is transmitted only when at least one condition is met.

5. The method of claim 4, wherein the condition is based on at least one of a state of the wireless device, a state of a wireless communication network to which the wireless device may be communicatively connected, a state of links between the wireless device and the network or other devices, a time, and a location of the wireless device.

6. The method of claim 5, wherein the state of the wireless device comprises the existing resources of the wireless device.

7. The method of claim 6, wherein the resources of the wireless device comprises at least one of a battery level of the wireless device, a memory condition of the wireless device, a condition of a SIM card of the wireless device, and a condition of an application on the wireless device.

8. The method of claim 5, wherein the state of a wireless communication network comprises at least one of a type of coverage of the wireless device, a state of roaming of the wireless device, a type of the wireless communication network, and a cost of data communication over the wireless communication network.

9. The method of claim 5, wherein the state of links comprises a received signal strength.

10. The method of claim 5, wherein the time comprises a local clock time or a global time obtained from an external source.

11. The method of claim 5 wherein the location comprises a cell-ID, a location area identifier, or physical location obtained from a Global Positioning System.

12. The method of claim 1, further comprising:
receiving a request from the remote device to reprogram the at least one trap administration variable, or the at least one condition defining when the trap payload associated with a trap is to be transmitted.

13. The method of claim 1, further comprising:
enabling a trap installed on the wireless device in response to a request to enable the trap received from the remote device.

14. The method of claim 1, further comprising:
receiving a request from the remote device to uninstall a previously installed trap instruction.

15. A wireless device comprising:
a receiver configured to receive from a remote device a request to install a trap instruction in software on the wireless device, the request including an identification of the trap instruction, and information indicating at least one trap status generation condition for the trap instruction; and
a device agent configured to:
install the trap instruction on the wireless device in response to the request from the remote device using the received identification of the trap instruction, and information indicating the at least one trap status generation condition for the trap instruction, wherein the trap instruction is installed on the wireless device including storing information relating to the trap in a tree structure in which nodes of the tree structure define traps that can be set, the tree structure organizing traps in a hierarchy of categories and each node being associated with a trap name, at least one trap administration variable, a trap payload, and at least one condition defining when the trap payload is to be transmitted,
monitor one or more traps in the tree structure based on one or more commands sent from the remote device to the wireless device, the one or more traps to be monitored being independent from the number of traps that have been defined,
generate an aggregated payload of trap status information by traversing the tree structure and collecting trap status information from a plurality of nodes of the tree structure, and transmit the aggregated payload of trap status information to the remote device.

16. The wireless device of claim 15, wherein the remote device is a management server.

17. The wireless device of claim 16, wherein the wireless device accepts the trap request only after verifying a signature of the management server and transmits an acknowledgement to the management server after the trap is enabled.

18. The wireless device of claim 15, wherein the trap status information is transmitted only when at least one condition is met.

19. The wireless device of claim 18, wherein the condition is based on at least one of a state of the wireless device, a state of a wireless communication network to which the wireless device may be communicatively connected, a state of links between the wireless device and the network or other devices, a time, and a location of the wireless device.

20. The wireless device of claim 19, wherein the state of the wireless device comprises resources of the wireless device.

21. The wireless device of claim 20, wherein the resources of the wireless device comprises at least one of a battery level of the wireless device, a memory condition of the wireless device, a condition of a SIM card of the wireless device, and a condition of an application on the wireless device.

22. The wireless device of claim 19, wherein the state of a wireless communication network comprises at least one of a type of coverage of the wireless device, a state of roaming of the wireless device, a type of the wireless communication network, and a cost of data communication over the wireless communication network.

23. The wireless device of claim 19, wherein the state of links comprises a received signal strength.

24. The wireless device of claim 19, wherein the time comprises a local clock time or a global time obtained from an external source.

25. The wireless device of claim 19 wherein the location comprises a cell-ID, a location area identifier, or physical location obtained from a Global Positioning System.

26. The wireless device of claim 15, wherein the receiver is further configured to receive a request from the remote device to reprogram the at least one trap administration variable, or the at least one condition defining when the trap payload associated with a trap is to be transmitted.

27. The wireless device of claim 15, wherein the device agent is further configured to enable a trap installed on the wireless device in response to a request to enable the trap received from the remote device.

28. The wireless device of claim 15, wherein the receiver is further configured to receive a request from the remote device to uninstall a previously installed trap instruction.

* * * * *

UNITED STATES PATENT AND TRADEMARK OFFICE
CERTIFICATE OF CORRECTION

| | |
|---|---|
| PATENT NO. | : 8,868,717 B2 |
| APPLICATION NO. | : 11/374987 |
| DATED | : October 21, 2014 |
| INVENTOR(S) | : Rakesh Kushwaha and Badri Nath |

It is certified that error appears in the above-identified patent and that said Letters Patent is hereby corrected as shown below:

In the Specification at column 4, line 5, change "TRAP$_{13}$enabled" to "TRAP_enabled".

Signed and Sealed this
Thirty-first Day of March, 2015

Michelle K. Lee
*Director of the United States Patent and Trademark Office*